(12) United States Patent
Wallace et al.

(10) Patent No.: US 10,034,228 B2
(45) Date of Patent: Jul. 24, 2018

(54) STATUS MONITORING OF UNCONNECTED WIRELESS BROADCAST DEVICES

(71) Applicant: Radius Networks Inc., Washington, DC (US)

(72) Inventors: Marc Wallace, Arlington, VA (US); Christopher Sexton, McLean, VA (US); David Helms, Arlington, VA (US); David Young, Washington, DC (US); Aaron Kromer, Silver Spring, MD (US)

(73) Assignee: RADIUS NETWORKS, INC., Washington, DC (US)

( * ) Notice: Subject to any disclaimer, the term of this patent is extended or adjusted under 35 U.S.C. 154(b) by 390 days.

(21) Appl. No.: 14/817,942

(22) Filed: Aug. 4, 2015

(65) Prior Publication Data
US 2017/0041360 A1 Feb. 9, 2017

(51) Int. Cl.
*H04W 48/16* (2009.01)
*H04W 4/80* (2018.01)
*H04L 12/26* (2006.01)
*H04W 48/14* (2009.01)

(52) U.S. Cl.
CPC ......... *H04W 48/16* (2013.01); *H04L 43/0811* (2013.01); *H04W 4/80* (2018.02); *H04W 48/14* (2013.01)

(58) Field of Classification Search
CPC ... H04W 48/00; H04W 48/10; H04L 43/0811; H04L 43/00
See application file for complete search history.

(56) References Cited

U.S. PATENT DOCUMENTS

| | | | |
|---|---|---|---|
| 2013/0100944 A1* | 4/2013 | Kwon | H04W 76/026 370/338 |
| 2013/0217332 A1* | 8/2013 | Altman | H04H 60/90 455/41.2 |

* cited by examiner

*Primary Examiner* — Oussama Roudani
(74) *Attorney, Agent, or Firm* — Vierra Magen Marcus LLP

(57) ABSTRACT

The system and method of the present disclosure relates to technology for monitoring a broadcast device that is non-network connected. A wireless device monitors for a broadcast message transmitted wirelessly by the broadcast device. Upon discovery of the broadcast message, the wireless device transmits information from the broadcast message to a remotely located sever via a network. The server stores the broadcast information and determines the status (e.g., online or offline) of the broadcast device. The status is determined based on the detection time (e.g., the last seen time of the broadcast device by the wireless device) and an offline threshold value (e.g., a predetermined time period) that is compared to the current time or time upon which the server received the broadcast information. As a result of the comparison, the server determines whether the broadcast device is online or offline.

20 Claims, 8 Drawing Sheets

| WIRELESS DEVICE | LAST SEEN AT TIME | THRESHOLD VALUE | CURRENT TIME | STATUS |
|---|---|---|---|---|
| 1 | 11:00 PM; 1/1/2015 | 1 DAY | 12:00 PM; 1/2/2015 | OFFLINE |
| 2 | 1:00 PM; 1/1/2015 | 1 DAY | 12:00 PM; 1/2/2015 | ONLINE |

STATUS MONITORING OF UNCONNECTED WIRELESS BROADCAST DEVICES

BACKGROUND

Short-range wireless proximity broadcast devices typically involve devices with a communications range of less than several hundred feet. These devices are typically employed in a location of business such that consumers entering the business may be provided with information by the business, for example, to a consumer's wireless device. These broadcast devices are also used by consumers, businesses, service organizations (among others) to establish or extend local area networks to locations that are not readily or desirably connected to wire network interface cards. However, as these broadcast devices are not network connected, it requires a person to physically access the broadcast device to determine the status of the device (i.e., whether the broadcast device is properly broadcasting information). This may be particularly onerous in situations where the broadcast devices are positioned in difficult to reach locations or too many devices are deployed at a specific location.

BRIEF SUMMARY

The present disclosure, generally described, relates to technology for monitoring a broadcast device that is non-network connected. More specifically, the system and method of the present disclosure relates to a platform to monitor the status of non-network connected broadcast devices that are wirelessly broadcasting a unique identifiers. The status of the non-network connected broadcast devices may be monitored using an agent embedded and deployed on wireless devices, such as a mobile device including but not limited to smart phones, tablets and computers. The wireless (and network connectable) devices upon discovering the broadcast identifier will update the status on the server and/or database communicatively connected to the server. Specifically, the status is obtained in a passive manner whereby the broadcast device is not connected to in an interactive mode, but rather by listening for packets that are broadcast by the broadcast device.

Accordingly, network operation systems or staff can monitor the current status of the broadcast devices.

In one embodiment, there is an apparatus monitoring a non-network connected broadcast device over a network, including a processor and memory; and an agent, executable by the processor, configured to: detect one or more non-network connected broadcast devices by discovering a broadcast message, the broadcast message including broadcast information; determine whether the detected one or more non-network connected broadcast devices has been previously detected; in response to determining that the detected one or more non-network connected broadcast devices has not been previously detected, generate a broadcast detection time, and transmit the broadcast information, including the broadcast detection time, to the remotely located server for storage via a transmitter; and in response to determining the detected one or more non-network connected broadcast devices has been previously detected, track the broadcast information of the one or more non-network connected broadcast devices, and store the tracked broadcast information in the memory for transmission by the transmitter to a remotely located server communicatively coupled to the network, the transmission including the broadcast information associated with the respective one or more non-network connected broadcast devices for updating the remotely located server.

In another embodiment, there is a method of monitoring a non-network connected broadcast device over a network, including detecting one or more non-network connected broadcast devices to determine a status to report to a remotely located server via the network; determining whether broadcast information of the detected one or more non-network connected broadcast devices is stored as an entry in a table of a database communicatively coupled to the remotely located server; in response to determining the broadcast information of the detected one or more non-network connected broadcast devices fails to include an entry in the database, generating a broadcast detection time as at least part of the broadcast information, and transmitting the broadcast information to the remotely located server to determine the status of the one or more non-network connected broadcast devices and to store the status in the table of the database; and in response to determining the detected one or more non-network connected broadcast devices has the entry in the database, tracking the broadcast information of the one or more non-network connected broadcast devices and updating the broadcast detection time of the entry in the table of the database associated with the respective one or more non-network connected broadcast devices.

In still another embodiment, there is a computer storage device comprising one or more processors and a memory having collectively stored therein instructions that, when executed by the processor, cause the processor to: receive broadcast information from a network connected mobile station via a network, wherein the broadcast information includes a broadcast identifier and a broadcast detection time; query a database communicatively connected to the one or more processors for the broadcast information of one or more non-network connected broadcast devices; in response to the query returning an offline threshold value corresponding to the one or more non-network connected broadcast devices, calculate an offline time as the broadcast detection time plus the offline threshold value; determine a status of the one or more non-network connected broadcast devices by comparing the offline time to a current time, and setting the status to online when the offline time is older than the current time and otherwise to offline; and updating an entry in the database to reflect the online/offline status of the one or more non-network connected broadcast devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

The present disclosure, generally described, relates to technology for monitoring a broadcast device that is non-network connected. In particular, a wireless device monitors for a broadcast message transmitted wirelessly by the broadcast device. Upon discovery of the broadcast message, the wireless device transmits information (e.g., broadcast information, such as a broadcast identifier and time stamp or detection time) from the broadcast message to a remotely located sever via a network. The transmitted broadcast information may be sent to the server upon receipt, for example when the wireless device is connected to the network, or stored in the wireless device and transmitted to the server at a later time, for example when the wireless device is not currently connected to the network. The server stores the broadcast information and determines the status (e.g., online or offline) of the broadcast device. The status is determined based on the detection time (e.g., the last seen time of the broadcast device by the wireless device) and an offline threshold value (e.g., a predetermined time period, such as 1 day) that is compared to the current time or time upon which the server received the broadcast information. As a result of the comparison, the server determines whether the broadcast device is online or offline.

Figure 1:
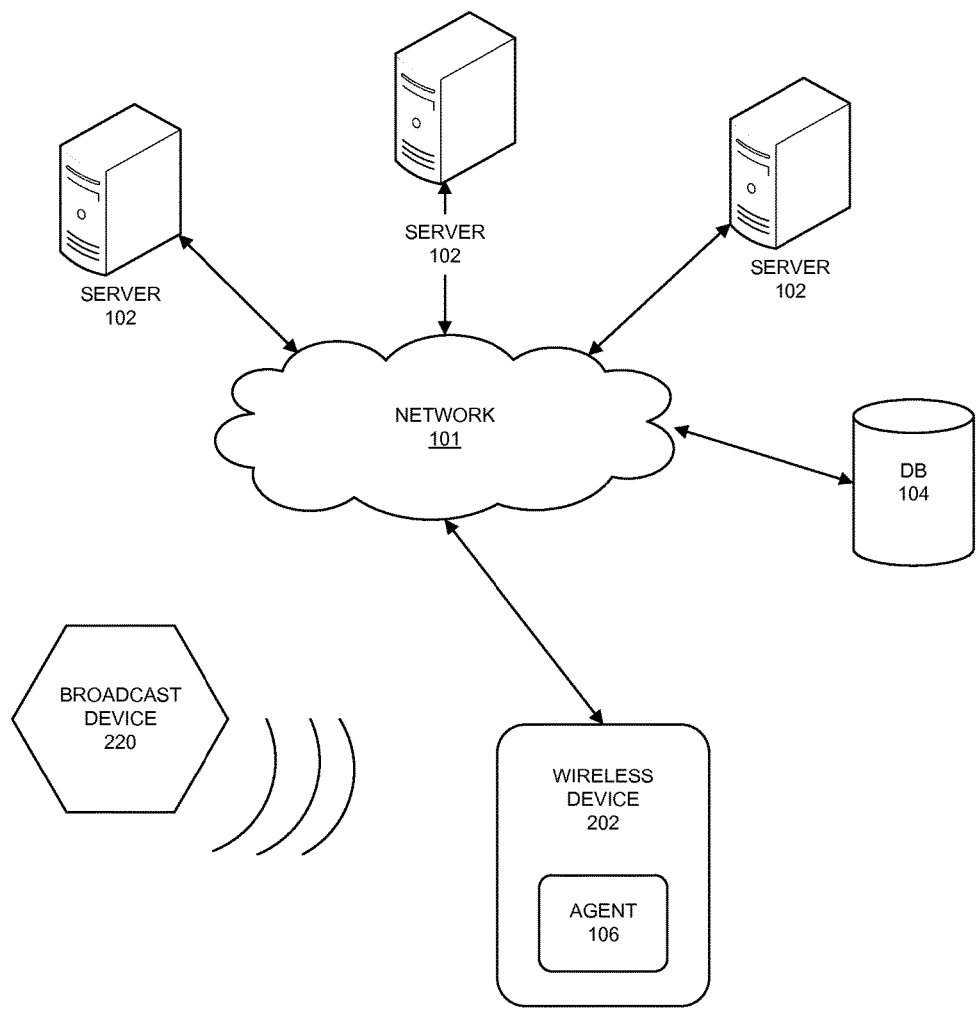
FIG. 1 is an exemplary diagram illustrating a system to monitor a wireless broadcast device in accordance with one embodiment.

FIG. 1 is an exemplary diagram illustrating a system to monitor a wireless broadcast device in accordance with one embodiment. The system includes, for example, a broadcast device 220, servers 102 and a wireless device or station 202 (including agent 106) operable by a user. The broadcast device 220 includes, for example a wireless transceiver module and a computer or processor (not shown). In one embodiment, the broadcast device 220 (also referred to herein as a non-network connected broadcast device) is not connected to network 101. However, it is appreciated that the broadcast device 220 may be configured for connection to network 101 in other embodiments. In one embodiment, the wireless transceiver module (which may comprise one or more modules) of broadcast device 220 may include one or more wired or wireless interfaces (despite its "wireless" name), such as a USB interface or a Bluetooth™ BLE module or any other wireless interface technology. The broadcast device 220 has wired or short range wireless capability (capable of communicating with devices wirelessly in proximity) for broadcasting messages using, for example, digital radio packet advertisements. However, the broadcast device 220 does not have a network connection that provides for long range communication.

Network 101 may be any network as readily understood, including but not limited to, any public or private network, or a combination of public and private networks such as the Internet, and/or a public switched telephone network (PSTN), or any other type of network that provides the ability for communication between computing resources, components, users, etc. The servers 102, in one embodiment, may be accessed and controlled by a user operating a common user interface (not shown), such as a web interface that enables a user to monitor the status of the broadcast device 220 via network 101. Information stored in the servers 102 (or storage device communicatively coupled to the servers) includes, for example, a broadcast identifier, a power level, advertising frequency, measure power calibration constant, status information and any other setting information (any one or more of which are collectively referred to as broadcast information). The servers 102 may also include or connect to one or more storage devices or systems, such as database 104, that store the broadcast information. The storage device or system 104 may be any type of storage, such as a database, data store, memory, etc., and is not limited to a single device. The storage device 104 may be located separately from the servers 102 or included as a part thereof.

It is appreciated that the system illustrated in FIG. 1 is not limited to devices depicted. Rather, any number of servers, broadcast devices, storage devices and wireless devices may be configured for connection and communication as part of the system. The broadcast device 220, wireless device 202 and the servers 102 will be described in more detail below with reference to the various figures.

Figure 2:
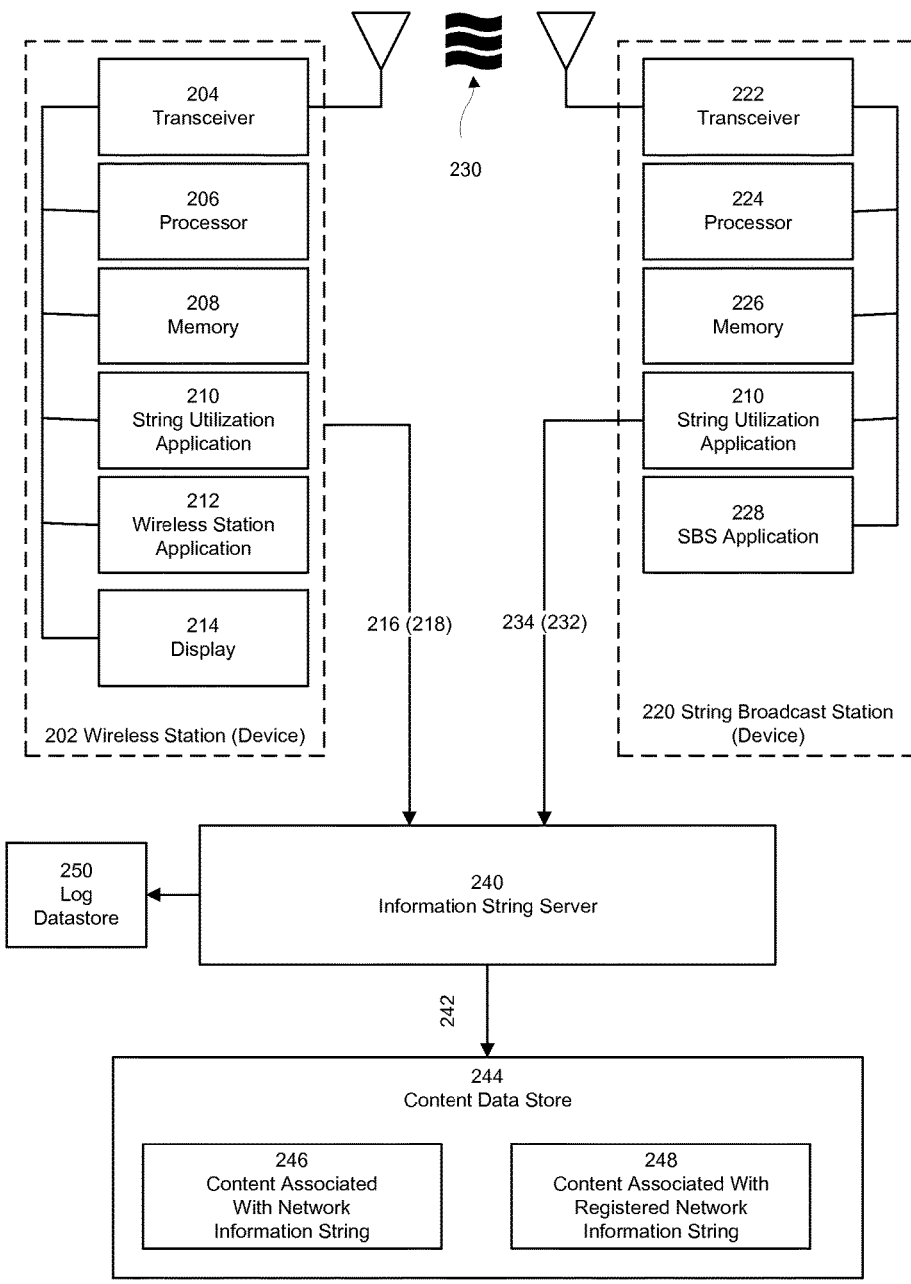
FIG. 2 is an exemplary diagram illustrating a process by which content may be associated with a network information string and stored.

FIG. 2 is an exemplary diagram illustrating a process by which content may be associated with a network information string and stored. A wireless (station) device 202 comprises, for example, a transceiver 204, a processor 206, a memory 208, a wireless station application 212 and a display 214. The wireless device 202 also operates an instance of string utilization application 210. The wireless station application 212 provides instructions to the processor 206 of the wireless device 202 to enable the wireless device 202 to interact with the broadcast device, such as a string broadcast station SBS 220, as for example and without limitation a Wifi or Bluetooth™ broadcast device, as is known in the art.

In an embodiment, an SBS 220 comprises a transceiver 222, a processor 224, a memory 226, and an SBS application 228. The SBS 220 also operates an instance of the string utilization application 210. The SBS application 228 provides instructions to the processor 224 of the SBS 220 to enable the SBS 220 to at least enable the SBS 220 to transmit broadcast message (or beacon message) 230. In an embodiment, the SBS 220 broadcasts a broadcast message 230 that includes a network information string. The network information string may be an SSID or a portion of an SSID as previously described.

Content may be delivered over a link 234 to, and stored in, a storage device, such as a content data store 244, by either the operator of the SBS 220 and/or the user of the wireless device 202. The content data store 244 is illustrated as supporting two records. The record 246 allows content to be stored in association with a network information string without regard to the ownership of the registration of the network information string. Thus, the operator of the SBS 220 or the user of the wireless device 202 may submit content to the content data store for association with a network information string and the content will be stored in the record 246. The record 248 is reserved for storage of content by a registered owner of a network information string.

As illustrated in FIG. 2, the content data store 244 is physically separate from the information string server 240. In this configuration, the content data store 244 may be located on a server 102 that is accessible to the information string server 240 via a link 242 and to the wireless station 202 via the link 216. In another embodiment, the content data store 242 is a component of the information string server 240 and the content data store 244 is served by the information string server 240 to the wireless station 202 via the communication link 216.

In another embodiment, content is stored in a memory of a wireless device 202, such as, for example and without limitation, memory 208 of wireless device 202. By way of illustration and not by way of limitation, the content may be stored in memory 208 of the wireless device 202 at the direction of a user of the wireless device 202, by virtue of the configuration of string utilization application 210, or in response to the acquisition of content by the wireless device 202 from the content data store 244.

Figure 3:
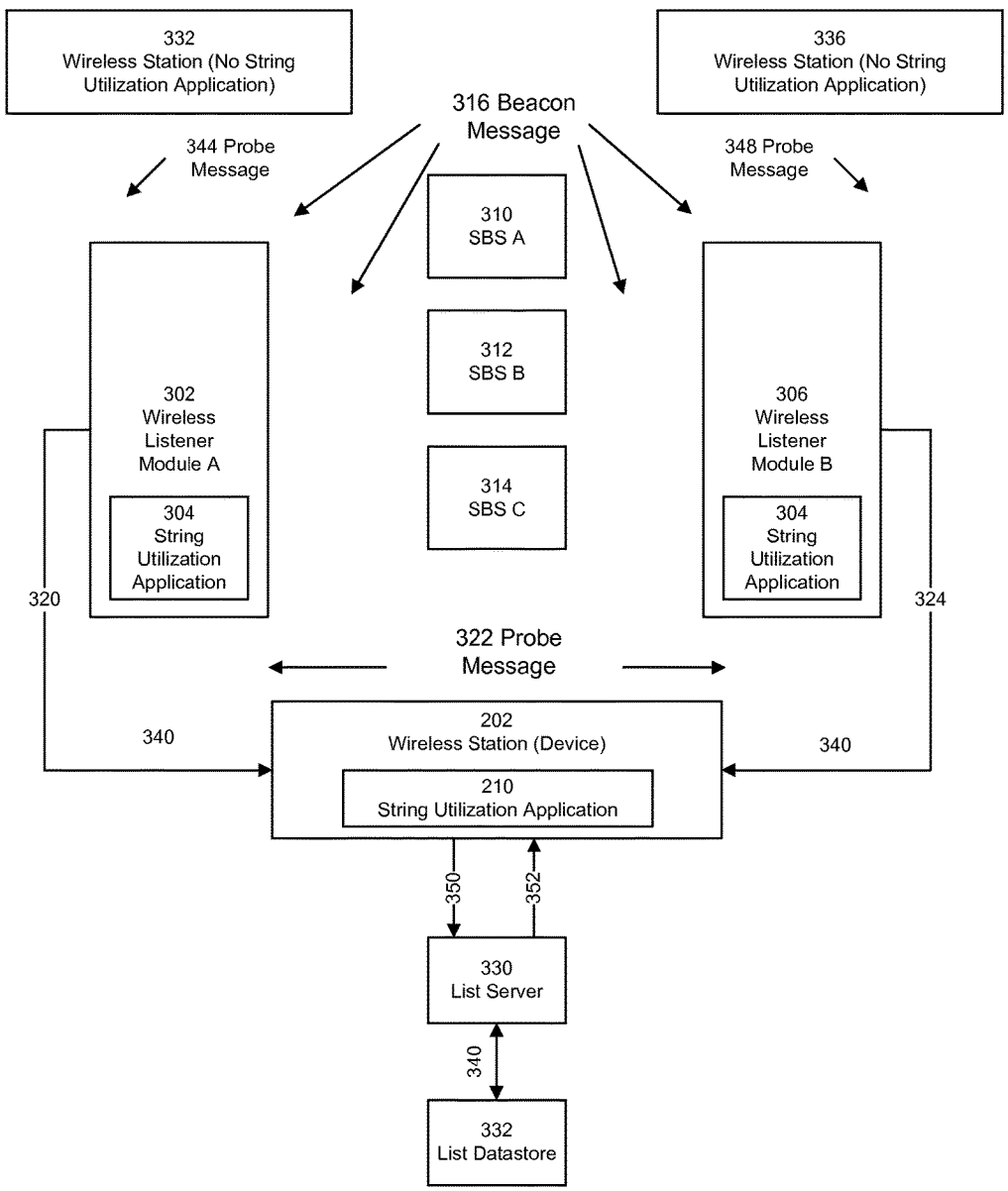
FIG. 3 is an exemplary diagram illustrating operations performed by a listener module according to an embodiment.

FIG. 3 is an exemplary diagram illustrating operations performed by a listener module according to an embodiment. Wireless listener module (device) A and B (elements 302 and 306) are configured to listen for broadcast messages 316 transmitted by string broadcast stations, such as SBS A, SBS B and SBS C (elements 310, 312 and 314). In an embodiment, an SBS broadcast message 316 comprises a network information string. A wireless listener module (elements 302 and 306) operating a string utilization application (element 304) receives one or more broadcast messages 316 and obtains the network information string from each received broadcast message. The wireless listener modules (elements 302 and 306) also receive a probe message 322 from a wireless device 202. The probe message includes the media access controller (MAC) address of the wireless device 202. Wireless device 202 also operates string utilization application 210.

In another embodiment, wireless listener module 302 also receives probe message 344 from wireless station 342. The probe message 344 includes the media access controller (MAC) address of the wireless station 342. Wireless station 342 does not operate an instance of the string utilization application 210. Similarly, wireless listener module 304 also receives probe message 348 from wireless station 346. The probe message includes the MAC address of the wireless station 346. Wireless station 346 also does not operate an instance of the string utilization application 210. Thus, a wireless listener module receives probe and broadcast messages from wireless stations and SBSs that are within range of the wireless listener module.

In an embodiment, a wireless listener module, such as module A and B, may also be configured to operate as an SBS and broadcast an SBS broadcast message that comprises a network information string. A wireless listener module, such as wireless listener module A, 302 associates the MAC address of the wireless station 202, the MAC address of wireless station 342, the MAC address of wireless station 344 and the MAC address of listener module A with the network information strings received from each broadcast message 416 and sends the network information strings and the MAC addresses to a list data server 330 for storage in a listener data store 332. The wireless listener module A 302 may also provide a timestamp that indicates when the wireless device 202 was proximate to the listener module A 302.

As illustrated in FIG. 3, wireless listener module A 302 connects to the list data server 330 via a link 320 and wireless listener module B 406 connects to list data server 330 via link 322. The links 320 and 322 may be wireless links, such as via a wireless LAN or a wireless telephone network, or may be a wired link, such as via DSL line, a cable network, or a fiber network. In another embodiment, wireless listener modules A 302 and B 406 communicate with each other and other wireless listener modules via a mesh network (not illustrated).

Using an instance of the string utilization application 210, the wireless device 202 may send a string data request message 350 for a list of network information strings proximate to its current location from the list server that have been reported by one or more listener modules, such as wireless listener module A 302, that have also detected the probe message and the MAC address of the wireless station 320. The string data request message 350 includes the MAC address of the wireless station 202. The list server 440 may respond to the string data request message by acquiring a list of network information strings associated with the MAC address of the wireless station 202 from the listener data store 332 and sending the list to the wireless device 202 in string data response message.

In an embodiment, a wireless listener module, such as wireless listener module A 302, may listen for probe messages periodically. The time of receipt of a probe message 322 is captured by a time stamp. When a wireless device moves out of range of the wireless listener module A 302, the elapsed time between a current time and the time indicated by a last time stamp will increase. This elapsed time period may be used by the data store 342 to measure the age of data relating to a MAC address and to log data (for example, MAC address and associated network information strings) to the listener data store 332 or to delete data of a particular age.

While FIG. 3 illustrates two listener modules A and B, the illustration is not limiting. Any number of listener modules may be deployed in a physical space to form a listener network. Because the location of each listener module within the listener network is known, the location of a wireless station that broadcasts a probe message (without regard to whether the wireless station operates a string utilization application) may be tracked within the listener network. Time stamping of the receipt of probe messages by each listener module within the listener network allows the presence, path, time at location, number of visits to a location, and other metrics to be determined on a per wireless station basis. Additionally, this information may be provided to a wireless device for reporting to servers or data stores consisted with description above with respect to FIGS. 1 and 2.

Figure 4:
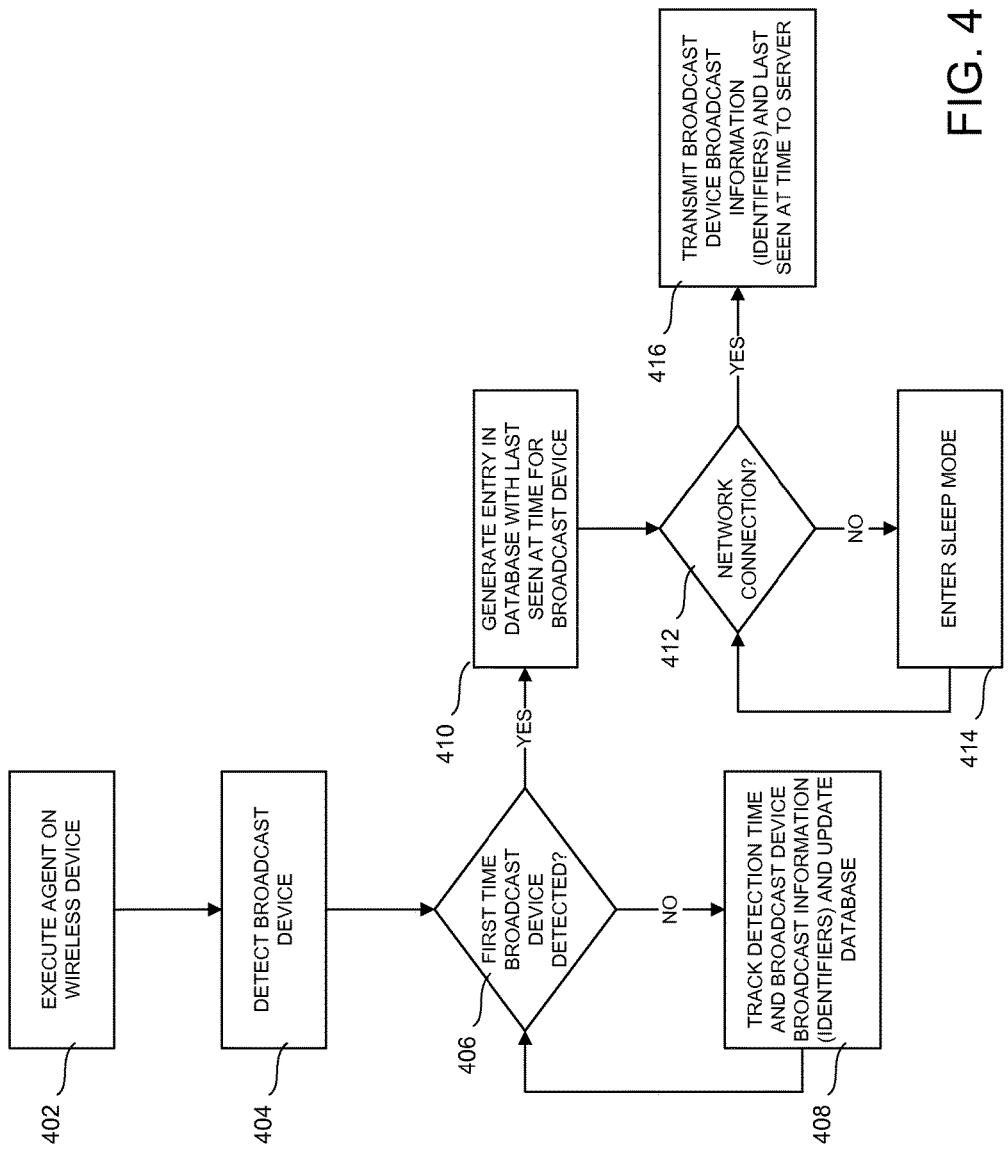
FIG. 4 is an exemplary flow diagram of a wireless device monitoring a broadcast device in accordance with the system of FIGS. 1-3.

FIG. 4 is an exemplary flow diagram of a wireless device monitoring a broadcast device in accordance with the system of FIGS. 1-3. At 402, the wireless device 202 executes an agent 106. Agent 106 may be a software agent (or intelligent agent) that operates independently or in connection with other applications on the wireless device 202 to monitor broadcast devices 220 transmitting broadcast messages 230. The agent 106 may be, for example, a set of instructions executable by a processor (e.g. processor 206) or hardware logic on the wireless device 202. Although the term agent is being used, the disclosure is not limited to such an embodiment. In a representative example, a loyalty application (e.g., an application that provides loyalty rewards, etc.) may reside on the wireless device 202 and include agent 106 to monitor for broadcast messages 230 sent by the broadcast devices 220. Alternatively, the loyalty application and the agent 106 may reside on the wireless device 202 as separate applications. In this case, agent 106 may be used separately to monitor and detect broadcasts from the broadcast device 220. Agent 106 can be pre-installed or installed-on-demand on the wireless device 202. Once it is installed, agent 106 may run in the background of wireless device 202 and communicate with the loyalty application.

The agent 106 on the wireless device 202 monitors and detects the broadcast message 230 transmitting from broadcast device 220 at 404. Detection of the broadcast device 220 indicates to the agent 106 that the broadcast device 220 is currently transmitting a broadcast message (including broadcast information). The agent 106 may determine whether the broadcast device 220 is being detected for the first time or has been previously detected by accessing internal memory, such as memory 208, or an external memory, such as storage device 104 connected via network 101 at 406. Alternatively, the server 102 may be provided with the broadcast information by the wireless device 202 and make the determination instead of the wireless device 202. Thus, once the broadcast message 230 has been detected, either the wireless device 202 or the server 102 may be responsible for implementation of the process. Likewise, it is appreciated that any other processing component capable of implementing such a process may also be utilized.

In the embodiment that follows, the agent is being used to implement the process. The agent 106 accesses, in one embodiment, the memory 208 or storage device 104 to determine whether a table or list (FIG. 7) of broadcast device 220 is stored therein. The table (or list) includes, for example, broadcast information taken from the broadcast message 230. If the table (or list) is identified, the agent 106 searches or queries the table for entries matching the broadcast identifier of detected broadcast message 230 of broadcast device 220. If a matching broadcast identifier entry is found, and the entry includes broadcast information, such as a detection time, then the broadcast device 220 has been previously detected (i.e., the previously recorded time is indicative of an earlier broadcast message detection). For example, the agent query of the table may return a result with an entry with a detection time (e.g. 12:00 PM; Jan. 1, 2015) associated with the broadcast identifier. The result is identified by the agent 106 on wireless device 202 as the broadcast device 220 having been previously detected.

Alternatively, if no broadcast information is found in the entry (or no entry exists for the detected broadcast device), then it is determined by agent 106 that the broadcast device 220 has not been previously detected. For example, the agent queries the table located in the storage system with a broadcast identifier, an empty entry is returned. That is, there is an entry for the broadcast identifier associated with the broadcast device, but no other information (such as a detection time) exists in the entry of the table. A discussion of the table and entries will be discussed below in more detail with reference to FIG. 7.

If the agent 106 determines at 406 that the broadcast device 220 has been previously detected, then the process proceeds to 408. At 408, the agent 106 updates the storage system 104 (e.g., DB 104 of FIG. 1) to record the detection time (and any other additional information from the broadcast information) and continues to track the broadcast device 220 for further transmission of broadcast messages 230. Otherwise, the process continues to 410 after the agent 106 determines that the broadcast device 220 has been newly discovered (i.e., first time the broadcast device has been detected).

At 410, the agent 106 generates the entry using the broadcast information, such as the broadcast identifier. The entry may also include other information from the broadcast information of the broadcast device 220. For example, the entry may include the detection time (time stamp) of the broadcast device 220. Once the entry has been created in the table, the agent 106 may identify the broadcast device 220 by its broadcast identifier in future broadcast messages. The table may also be updated, for example with a "last seen at" detection time.

Upon generation of the entry, the entry is transmitted to one of the servers 102 for storage in the table. For example, the broadcast device 220 may transmit a broadcast identifier DD9D408E-0741-472B-95AF-AD5EA8A9D00B of the broadcast message 230 (of broadcast device 220) to server 102 for entry into the table. Subsequently or together with the broadcast identifier transmission, the agent 106 may append a time stamp 23:00 Jan. 2, 2015 to the entry.

In one embodiment, if the table is not already created in the storage system 104, the server 102 may generate a table prior to adding the entry.

Transmission of the generated entry may occur anytime that the wireless device 202 has a connection to network 101. At 412, the wireless device 202 determines whether a network connection exists. If the wireless device 202 is not connected to a network, the wireless device 202 enters into a sleep mode and waits for a network connection at 414. The entry is stored in memory 208 until the entry is transmitted. If the wireless device 202 is connected to a network as determined at 412, the entry may be transmitted to one of the servers 102 at 416. Alternatively, the wireless device 202 may transmit the broadcast information (including the broadcast identifier) and the timestamp or detection time without generation of an entry. That is, the detected broadcast information (or any portion thereof) may be forwarded to server 102 via network 101, without generation of an entry. In this embodiment, the server 102 will generate the entry based on the received broadcast information.

Figure 5:
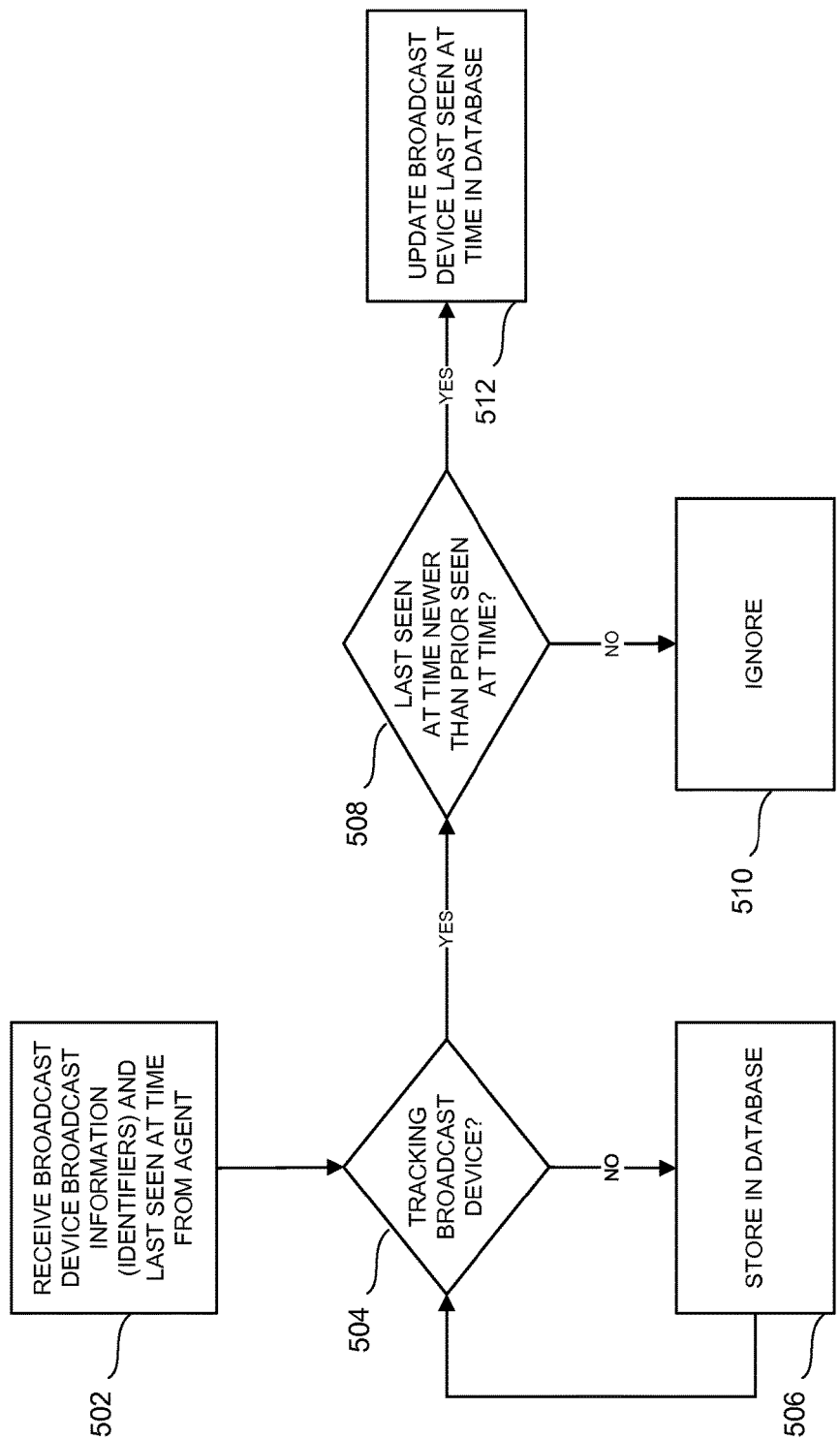
FIG. 5 is an exemplary flow diagram of a server updating a storage system with broadcast information transmitted in accordance with FIG. 4.

FIG. 5 is an exemplary flow diagram of a server updating a storage system with broadcast information transmitted in accordance with FIG. 4. At 502, the entry including the broadcast information and detection time (time stamp) is received by the server 102 from agent 106 (transmitted at 416 in FIG. 4). As noted above, and in an alternative embodiment, the broadcast information and detection time may be received without an entry having been generated by the agent 106 of wireless device 202. In this case, the server 102 generates the entry. At 504, the server 102 determines whether the broadcast device 220 has been previously tracked by the wireless device 202. To determine whether the broadcast device 220 has been previously tracked, the server 102 queries the storage system 104 with the broadcast identifier of the broadcast device 220. If the broadcast identifier is not found in the storage system 104 (e.g., a table with an entry including the broadcast identifier is located in the storage system) in response to the query, the storage system 104 is updated with the entry (or a new entry is created and the table is updated) in the existing table at 506. The update records the detection time (i.e., last seen at time) associated with the broadcast identifier for later use in determining the status of the corresponding broadcast device 220.

If the query to storage system 104 results in a broadcast identifier being returned (i.e., the broadcast identifier is found in the storage system), then the server 102 determines whether the detection time (last seen at time) is newer than the detection time previously recorded (prior seen at time) at 508. When the detection time is older than the previously recorded detection time, the entry is ignored at 510. Otherwise, at 512, when the detection time is newer than the previously recorded detection time, the table in the storage system 104 is updated to reflect the newer detection time. For example, the broadcast device 220 broadcasts a broadcast message 230 including a broadcast identifier. The broadcast message is discovered by the wireless device 202 at 12:00 on Jan. 1, 2015. The broadcast information, including the detection time, is transmitted to the server 102 (when a network connection is available) for storage in the table of storage system 104. The table is queried with the broadcast identifier to determine the detection time previously recorded. The query returns the prior seen at time of 12:00 on Dec. 30, 2014 (i.e., the detection time), and determines that the last seen at time is newer than the prior seen at time. The table entry associated with the broadcast identifier is updated with the last seen at time.

Figure 6:
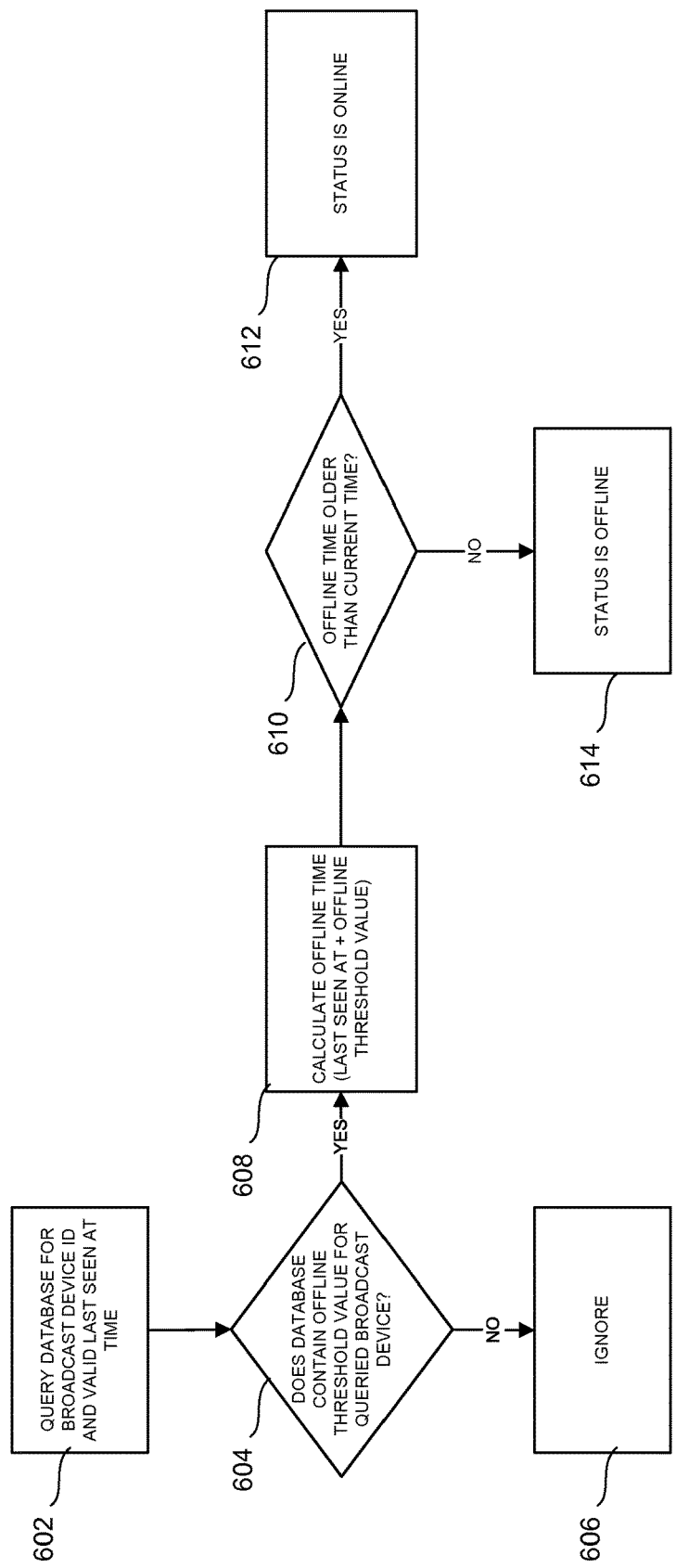
FIG. 6 is an exemplary flow diagram of a server querying a storage system for calculation of an offline time in accordance with the systems in FIGS. 1-3.

FIG. 6 is an exemplary flow diagram of a server querying a storage system for calculation of an offline time in accordance with the systems in FIGS. 1-3. The process described in FIG. 6 relates to determining the status of a broadcast device 220. In particular, the process calculates the amount of time a broadcast device 220 has been offline (or remains online) based on a threshold value accessible to the server 102. At 602, the server queries the storage system 104 (database) with the broadcast identifier of the broadcast device 220 and the last seen at time. The query searches the storage system 104 to determine whether it contains a threshold value. The threshold value may be a predetermined value or a selectable value by the user at the time of the query. Effectively, the threshold value will be a value, that when met or exceeded, is applied in calculating the status of the broadcast device 220. More than one threshold value may be stored, and different threshold values may be assigned to different broadcast devices 220 or a group of broadcast devices 220. Moreover, the threshold value may be modified for any one query.

If no threshold value is stored in the storage system 104, then the query is ignored and ends. Otherwise, if a threshold value(s) is found as a result of the query by the server 102, the offline time for the broadcast device 220 is calculated by the server 102 at 608. The offline time is calculated as the last seen at time plus the threshold value. If the calculated offline time is older than the current time (i.e., the detection time stored in the database table), then the server 102 determines the status of the broadcast device 220 to be online (at 612). If, on the other hand, the calculated offline time is not older than the current time, the status is determined to be offline (at 614).

Figure 7:
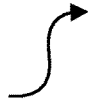
FIG. 7 is an exemplary table with entries stored in the storage system in accordance with FIGS. 1-3.

FIG. 7 is an exemplary table with entries stored in the storage system in accordance with FIGS. 1-3. Table 700 depicts an exemplary table stored in storage system (e.g., database) 104. In the exemplary table 700, there are five columns with labels: wireless device, last seen at time, threshold value, current time and status. Entries are stored in rows of the table, where the wireless device is identified by a broadcast identifier. In the example, two wireless devices have identifiers 1 and 2, respectively. It is appreciated that the identifiers in the example are for ease of explanation, but that a complete broadcast identifier, as described above, may be used.

For wireless device 1, the last seen at time is 11:00 PM Jan. 1, 2015, the threshold value is 1 day and the current time is 12:00 PM Jan. 2, 2015. Accordingly, the calculated offline time (explained above) is 11:00 PM on Jan. 1, 2015 plus 1 day=11:00 PM on Jan. 2, 2015. As the current time is 12:00 PM Jan. 2, 2015, the offline time is older than the current time and the status is set to offline (i.e., more that the threshold value of 1 day has passed). For wireless device 2, the last seen at time is 1:00 PM Jan. 1, 2015, the threshold value is 1 day and the current time is 12:00 PM Jan. 2, 2015. Accordingly, the calculated offline time is 1:00 PM on Jan. 1, 2015 plus 1 day=1:00 PM on Jan. 2, 2015. As the current time is 12:00 PM Jan. 2, 2015, the offline time is not older than the current time and the status is set to online.

Exemplary Use Scenarios

Obtain the non-network connected broadcast device status using the agent installed on the wireless device of one or more users. The agent will monitor for the broadcast device's broadcast message, including the broadcast identifier. Upon discovering the broadcast device, the last seen time associated with the broadcast identifier will be uploaded to the server.

The server will have a timeout threshold (threshold value) configured, after which time elapses the broadcast device will be considered offline or down.

In a first exemplary scenario, the broadcast device 220 is configured to broadcast identifiers: UUID: DD9D408E-0741-472B-95AF-AD5EA8A9D00B. The server 102 will track the broadcast identifiers via the wireless devices 202, and sets a "last seen at time" (e.g., a threshold value) to be 1 day. User A, having the agent 106 installed on a wireless device 202, such as a mobile phone, discovers the broadcast device 220 at 12:00 Jan. 1, 2015, and transmits broadcast information to the server 102. No other wireless device 202 detects the broadcast device 220. At 12:00 Jan. 2, 2015, the server 102 calculates the offline time, as described above, and determines that the broadcast device 220 is offline. The table is the storage system 104 is updated to reflect the status.

In a second exemplary scenario, the broadcast device 220 is configured to broadcast identifiers: UUID: DD9D408E-0741-472B-95AF-AD5EA8A9D00B. The server 102 tracks the broadcast identifiers, via the wireless devices 202, and sets a "last seen at time" (e.g., a threshold value) to be 1 day. User A has the agent 106 installed thereon and discovers the broadcast device 220 at 12:00 Jan. 1, 2015. The broadcast information is transmitted to the server 102 by the User A's wireless device 202 when network connected. User A continues to track the broadcast device 220 and discovers the broadcast device's broad message again at 18:00 Jan. 1, 2015. The broadcast information is transmitted to the server 102. At 23:00 Jan. 1, 2015, user A's device discovers the broadcast device 220 with the same broadcast identifier. The broadcast information is transmitted again to the server 104. At 12:00 Jan. 2, 2015 the server 104 analyzes the table for detection time entries associated with the broadcast identifier of broadcast device 220 and determines the broadcast device 220 to be online. That is, the amount of time having expired between the "last see at time" (23:00 Jan. 1, 2015) and the current time (12:00 Jan. 2, 2015) is less than 1 day.

As appreciated, the above use scenarios are non-limiting and exemplary embodiments. Thus, the disclosure is not limited to the specific embodiments.

Figure 8:
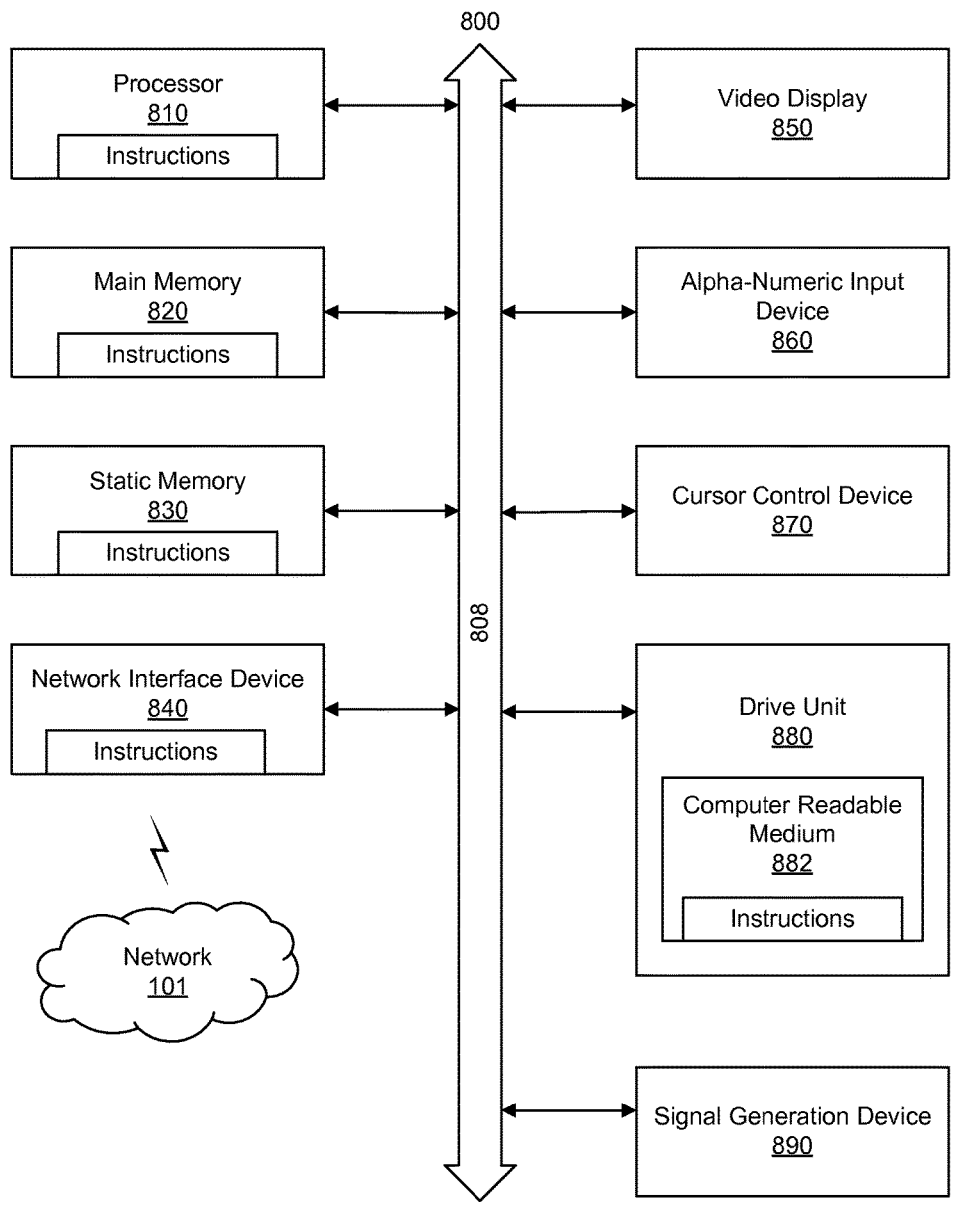
FIG. 8 shows an exemplary general computer system that may be used to implement the process and system depicted in FIGS. 1-6.

FIG. 8 is an illustrative embodiment of a general computer system. The general computer system which is shown and is designated 800 may be used to implement the processes and systems illustrated in FIGS. 1-6. The computer system 800 can include a set of instructions that can be executed to cause the computer system 800 to perform any one or more of the methods or computer based functions disclosed herein. The computer system 800 may operate as a standalone device or may be connected, for example, using a network 101, to other computer systems or peripheral devices.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In a networked deployment, the computer system 800 may operate in the capacity of a server or as a client user computer in a server-client user network environment, or as a peer computer system in a peer-to-peer (or distributed) network environment. The computer system 100 can also be implemented as or incorporated into various devices, such as a data interface, stationary computer, a mobile computer, a personal computer (PC), a laptop computer, a tablet computer, a wireless smart phone, a personal digital assistant (PDA), a global positioning satellite (GPS) device, a communication device, a control system, a web appliance, a network router, switch or bridge, a web server, or any other machine capable of executing a set of instructions (sequential or otherwise) that specify actions to be taken by that machine. The computer system 800 can be incorporated as or in a particular device that in turn is in an integrated system that includes additional devices. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 includes a processor 810. A processor for a computer system 800 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at anytime. A processor is an article of manufacture and/or a machine component. A processor for a computer system 800 is configured to execute software instructions in order to perform functions as described in the various embodiments herein. A processor for a computer system 800 may be a general purpose processor or may be part of an application specific integrated circuit (ASIC). A processor for a computer system 800 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 800 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 800 includes a main memory 820 and a static memory 830 that can communicate with each, and processor 810, other via a bus 808. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 800 may further include a video display unit 850, such as a liquid crystal display (LCD), an organic light emitting diode (OLED), a flat panel display, a solid state display, or a cathode ray tube (CRT). Additionally, the computer system 800 may include an input device 860, such as a keyboard/virtual keyboard or touch-sensitive input screen or speech input with speech recognition, and a cursor control device 870, such as a mouse or touch-sensitive input screen or pad. The computer system 800 can also include a disk drive unit 880, a signal generation device 890, such as a speaker or remote control, and a network interface device 840.

In a particular embodiment, as depicted in FIG. 8, the disk drive unit 880 may include a computer-readable medium 882 in which one or more sets of instructions 884, e.g. software, can be embedded. Sets of instructions 884 can be read from the computer-readable medium 882. Further, the instructions 884, when executed by a processor, can be used to perform one or more of the methods and processes as described herein. In a particular embodiment, the instructions 884 may reside completely, or at least partially, within the main memory 820, the static memory 830, and/or within the processor 810 during execution by the computer system 800.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for monitoring a non-network connected broadcast device over a network, comprising:
    a processor and memory; and an agent, executable by the processor, configured to:
    detect one or more non-network connected broadcast devices by discovering a broadcast message, the broadcast message including broadcast information;
    determine whether the detected one or more non-network connected broadcast devices has been previously detected;
    in response to determining that the detected one or more non-network connected broadcast devices has not been previously detected, generate a broadcast detection time, and transmit the broadcast information, including the broadcast detection time, to the remotely located server for storage via a transmitter; and
    in response to determining the detected one or more non-network connected broadcast devices has been previously detected, track the broadcast information of the one or more non-network connected broadcast devices, and store the tracked broadcast information in the memory for transmission by the transmitter to a remotely located server communicatively coupled to the network, the transmission including the broadcast information associated with the respective one or more non-network connected broadcast devices for the remotely located server, wherein the transmission causes the remotely located server, in response to returning an offline threshold value corresponding to the one or more non-network connected broadcast devices, calculate an offline time as the broadcast detection time plus the offline threshold value, determine a status of the one or more non-network connected broadcast devices by comparing the offline time to a current time, set the status to online when the offline time is older than the current time and otherwise to offline, and update entries in a table of a database coupled to the remotely located server to reflect the online/offline state of the one or more non-network connected broadcast devices.

2. The apparatus of claim 1, wherein
    the apparatus is a mobile device and a plurality of apparatuses are network connected to the remotely located server, and
    the database stores the entries in the table comprising the broadcast information.

3. The apparatus of claim 2, wherein the broadcast information comprises a broadcast identifier and the broadcast detection time of the one or more non-network connected broadcast device.

4. The apparatus of claim 1, the agent further configured to identify the status of the one or more non-network connected devices based on the broadcast information, wherein the status indicates at least one of the online/offline state, a transmitter power level, an advertising frequency and a measured power calibration constant of one or more of the non-network connected broadcast devices.

5. The apparatus of claim 3, the agent further configured to:
    receive the broadcast information from the one or more non-network connected broadcast devices; and
    register the one or more non-network connected broadcast devices and corresponding broadcast information with the remotely located server in response to not having previously detected the one or more non-network connected broadcast devices.

6. The apparatus of claim 1, wherein the agent enters into a sleep mode when a connection to the network is unavailable.

7. The apparatus of claim 1, wherein one or more of the non-network connected broadcast devices is deployed in a place of business.

8. A method of monitoring a non-network connected broadcast device over a network, comprising:
    detecting one or more non-network connected broadcast devices to determine a status to report to a remotely located server via the network;
    determining whether broadcast information of the detected one or more non-network connected broadcast devices is stored as an entry in a table of a database communicatively coupled to the remotely located server;
    in response to determining the broadcast information of the detected one or more non-network connected broadcast devices fails to include an entry in the database,
        generating a broadcast detection time as at least part of the broadcast information, and
        transmitting the broadcast information to the remotely located server to determine the status of the one or more non-network connected broadcast devices and to store the status in the table of the database; and
    in response to determining the detected one or more non-network connected broadcast devices has the entry in the table of the database,
        tracking the broadcast information of the one or more non-network connected broadcast devices and updating the broadcast detection time of the entry in the table of the database associated with the respective one or more non-network connected broadcast devices, wherein transmitting the broadcast information causes the remotely located server to, in response to returning an offline threshold value corresponding to the one or more non-network connected broadcast devices, calculate an offline time as the broadcast detection time plus the offline threshold value, determine the status of the one or more non-network connected broadcast devices by comparing the offline time to a current time, set the status to online when the offline time is older than the current time and otherwise to offline, and update the entry in the table of the database to reflect the online/offline state of the one or more non-network connected broadcast devices.

9. The method of claim 8, wherein the broadcast information comprises a broadcast identifier and the broadcast detection time of the one or more non-network connected broadcast device.

10. The method of claim 8, wherein the status indicates at least one of the online/offline state, a transmitter power level, an advertising frequency and a measured power calibration constant of one or more of the non-network connected broadcast devices.

11. The method of claim 9, further comprising:
receiving the broadcast information from the one or more non-network connected broadcast devices; and
registering the one or more non-network connected broadcast devices and corresponding broadcast information with the remotely located server in response to being detected a first time.

12. The method of claim 8, further comprising a network connected agent to execute the detecting and determining via one or more processors.

13. The method of claim 8, further comprising entering a sleep mode when a connection to the network is unavailable.

14. The method of claim 8, wherein one or more of the non-network connected broadcast devices is deployed in a place of business and operable to transmit the broadcast information to one or more wireless stations.

15. A computer storage device comprising one or more processors and a memory having collectively stored therein instructions that, when executed by the processor, cause the processor to:
detect one or more non-network connected broadcast devices to determine a status to report to a remotely located server via the network;
determine whether broadcast information of the detected one or more non-network connected broadcast devices is stored as an entry in a table of a database communicatively coupled to the remotely located server;
in response to determining the broadcast information of the detected one or more non-network connected broadcast devices fails to include an entry in the database, generating a broadcast detection time as at least part of the broadcast information, and transmitting the broadcast information to the remotely located server to determine the status of the one or more non-network connected broadcast devices and to store the status in the table of the database; and
in response to determining the detected one or more non-network connected broadcast devices has the entry in the table of the database,
tracking the broadcast information of the one or more non-network connected broadcast devices and updating the broadcast detection time of the entry in the table of the database associated with the respective one or more non-network connected broadcast devices, wherein
transmitting the broadcast information causes the remotely located server to, in response to returning an offline threshold value corresponding to the one or more non-network connected broadcast devices, calculate an offline time as the broadcast detection time plus the offline threshold value, determine the status of the one or more non-network connected broadcast devices by comparing the offline time to a current time, set the status to online when the offline time is older than the current time and otherwise to offline, and update the entry in the table of the database to reflect the online/offline state of the one or more non-network connected broadcast devices.

16. The computer storage device of claim 15, wherein the broadcast information comprises a broadcast identifier and the broadcast detection time of the one or more non-network connected broadcast device.

17. The computer storage device of claim 15, wherein the status indicates at least one of the online/offline state, a transmitter power level, an advertising frequency and a measured power calibration constant of one or more of the non-network connected broadcast devices.

18. The computer storage device d of claim 16, further causing the processor to:
receive the broadcast information from the one or more non-network connected broadcast devices; and
register the one or more non-network connected broadcast devices and corresponding broadcast information with the remotely located server in response to being detected a first time.

19. The computer storage device of claim 15, further causing the processor to enter a sleep mode when a connection to the network is unavailable.

20. The computer storage device of claim 15, wherein one or more of the non-network connected broadcast devices is deployed in a place of business and operable to transmit the broadcast information to one or more wireless stations.

* * * * *